US012808417B2

(12) United States Patent
Mazzoni et al.

(10) Patent No.: US 12,808,417 B2
(45) Date of Patent: Nov. 24, 2026

(54) BRAKING SYSTEM WITH BRAKE-BY-WIRE TYPE DISC BRAKES, EQUIPPED WITH DYNAMIC ADJUSTMENT OF THE DISTANCE BETWEEN THE BRAKE DISC AND THE PADS AND RELATED METHOD FOR ADJUSTING THE DISTANCE BETWEEN THE BRAKE DISC AND PADS IN A BRAKE-BY-WIRE TYPE BRAKING SYSTEM

(71) Applicant: BREMBO S.p.A., Curno (IT)

(72) Inventors: Matteo Mazzoni, Curno (IT); Alessandro Rossi, Curno (IT); Beniamin Szewczyk, Curno (IT); Davide Tavernini, Guildford (GB); Patrick Gruber, Guildford (GB); Aldo Sorniotti, Guildford (GB); Victor Vidal Munoz, Guildford (GB)

(73) Assignee: Brembo S.p.A., Curno (IT)

( * ) Notice: Subject to any disclaimer, the term of this patent is extended or adjusted under 35 U.S.C. 154(b) by 386 days.

(21) Appl. No.: 18/561,401

(22) PCT Filed: May 16, 2022

(86) PCT No.: PCT/IB2022/054536
§ 371 (c)(1),
(2) Date: Nov. 16, 2023

(87) PCT Pub. No.: WO2022/243841
PCT Pub. Date: Nov. 24, 2022

(65) Prior Publication Data

US 2024/0240683 A1 Jul. 18, 2024

(30) Foreign Application Priority Data

May 19, 2021 (IT) ........................ 102021000012968

(51) Int. Cl.
*F16D 65/38* (2006.01)
*B60T 13/74* (2006.01)
(Continued)

(52) U.S. Cl.
CPC ............ *F16D 65/38* (2013.01); *B60T 13/741* (2013.01); *F16D 55/228* (2013.01);
(Continued)

(58) Field of Classification Search
CPC .. F16D 65/38; F16D 55/228; F16D 2065/386; F16D 2121/18; F16D 2127/02;
(Continued)

(56) References Cited

U.S. PATENT DOCUMENTS 5,123,505 A * 6/1992 Antony ................. F16D 65/567 188/71.9
6,397,977 B1 * 6/2002 Ward .................... F16D 65/183 188/71.9
(Continued)

FOREIGN PATENT DOCUMENTS

DE 112015005833 T5 9/2017
JP 2001341626 A 12/2001
(Continued)

OTHER PUBLICATIONS

European Patent Office, International Search Report, issued in PCT/IB2022/054536, Jul. 22, 2022, Rijswijk, NL.
(Continued)

*Primary Examiner* — Henry Y Liu
(74) *Attorney, Agent, or Firm* — Marshall & Melhorn LLC

(57) ABSTRACT

A braking system for a vehicle has a disc brake having a brake disc having a disc brake caliper and a pair of pads, an electric actuator operatively connected to a piston acting as a pusher on at least one of the pads, and a processing and
(Continued)

control unit operatively connected to the electric actuator and programmed to move the piston and respective pad to a forward position to press the pad into contact with the brake disc during a braking demand, and bring the piston and respective pad to a rest or rearward position. A gap is identified between the pad and the brake disc. The processing and control unit is programmed to implement an algorithm that, in absence of a braking demand, operates the electric actuator by varying the gap according to at least one dynamic parameter of the vehicle defining a prediction of a braking demand.

18 Claims, 1 Drawing Sheet

(51) Int. Cl.
*F16D 55/228* (2006.01)
*F16D 121/18* (2012.01)
*F16D 127/02* (2012.01)

(52) U.S. Cl.
CPC ....... *B60T 2210/12* (2013.01); *B60T 2210/20* (2013.01); *B60T 2210/32* (2013.01); *F16D 2065/386* (2013.01); *F16D 2121/18* (2013.01); *F16D 2127/02* (2013.01)

(58) Field of Classification Search
CPC .... B60T 13/741; B60T 17/221; B60T 13/662; B60T 13/74; B60T 2201/12; B60T 2210/20; B60T 2210/32; B60T 2210/12; B60Y 2400/81
See application file for complete search history.

(56) References Cited

U.S. PATENT DOCUMENTS 6,971,484 B2 * 12/2005 Sekiguchi ............... F16D 65/18 188/72.7
7,293,843 B2 * 11/2007 Miyazaki ............. B60T 8/4081 303/158
9,752,634 B2 * 9/2017 Yasui .................... B60T 13/741
10,138,960 B2 * 11/2018 Yasui .................... F16D 55/226
10,232,834 B2 * 3/2019 Okada ................... B60T 8/1761
10,393,200 B2 * 8/2019 Kim .................... F16H 25/2018
10,408,289 B2 * 9/2019 Chelaidite ............ B60T 13/741
10,487,896 B2 * 11/2019 Demorais ............ F16D 55/228
10,661,772 B2 * 5/2020 Yasui .................... B60T 13/741
10,696,285 B2 * 6/2020 Yasui ........................ B60T 8/17
11,187,291 B2 * 11/2021 Yamauchi ............... F16D 65/18
11,193,547 B2 * 12/2021 Gerber .................... B60T 1/065
11,577,711 B2 * 2/2023 Ritter .................. F16D 65/0043
11,590,954 B2 * 2/2023 Takahashi ............... B60T 8/171
11,761,498 B2 * 9/2023 Krasnoff ................. F16D 65/18 188/73.43
11,932,224 B2 * 3/2024 Itakura .................. F16D 65/183
11,958,459 B2 * 4/2024 Itakura .................. B60T 17/221
12,000,443 B2 * 6/2024 Baek ...................... B60T 13/741
12,194,971 B2 * 1/2025 Hossfeld ................ H02K 11/21
12,241,513 B2 * 3/2025 Gerber ................ B60T 8/17613
12,269,448 B2 * 4/2025 Karajgi ................. F16H 55/171
12,326,176 B2 * 6/2025 Brubaker .............. F16D 65/183
12,385,540 B2 * 8/2025 Tarandek .............. F16D 55/226
12,397,767 B2 * 8/2025 Sakashita ............ F16D 65/0971
2003/0042084 A1 * 3/2003 Kawase .................. F16D 55/00 188/72.1
2004/0222695 A1 * 11/2004 Miyazaki .............. B60T 8/4081 303/155
2004/0262098 A1 * 12/2004 Baumann ................ F16D 65/58 188/72.8
2009/0133975 A1 * 5/2009 Gilles ..................... F16D 65/18 188/72.6
2010/0243387 A1 * 9/2010 Vollert .................. F16D 65/567 188/156
2011/0291503 A1 * 12/2011 Wolf ...................... H02K 7/085 188/67
2014/0000992 A1 * 1/2014 Tajima .................... B60T 1/005 188/72.1
2014/0069750 A1 * 3/2014 Nohira .................. B60T 13/741 188/71.8
2015/0300433 A1 * 10/2015 Yasui .................... B60T 13/741 188/162
2015/0323026 A1 * 11/2015 Yasui .................... F16H 25/186 74/89
2016/0355169 A1 * 12/2016 Ohlig .................... B60T 13/741
2017/0217409 A1 * 8/2017 Masuda .................. F16D 66/00
2017/0234380 A1 * 8/2017 Yasui .................... F16D 63/006 188/72.1
2017/0355356 A1 * 12/2017 Okada ....................... B60T 7/06
2018/0045255 A1 * 2/2018 Chelaidite ............... F16D 65/16
2018/0087590 A1 * 3/2018 Chelaidite ............ F16D 55/226
2018/0094683 A1 * 4/2018 Kim ........................ F16D 65/18
2018/0319384 A1 * 11/2018 Yasui .................... B60T 13/741
2019/0023248 A1 * 1/2019 Yasui .................... B60T 13/741
2019/0118790 A1 * 4/2019 Severinsson .......... B60T 13/746
2019/0145475 A1 * 5/2019 Yamauchi ............... F16D 65/18 188/72.8
2019/0316644 A1 * 10/2019 Demorais ............... F16D 65/18
2020/0247380 A1 * 8/2020 Baehrle-Miller ..... F16D 55/226
2020/0339093 A1 * 10/2020 Takahashi ............. B60T 13/741
2021/0197777 A1 * 7/2021 Itakura .................. B60T 13/746
2021/0301889 A1 * 9/2021 Gerber .................. B60T 13/746
2021/0396282 A1 * 12/2021 Krasnoff ................. F16D 65/18
2022/0001845 A1 * 1/2022 Itakura .................... F16D 66/00
2022/0260125 A1 * 8/2022 Tarandek ................ B60T 1/065
2022/0281431 A1 * 9/2022 Ritter ...................... F16D 65/14
2022/0364618 A1 * 11/2022 Brubaker .............. F16D 65/183
2022/0396253 A1 * 12/2022 Karajgi ................... F16D 65/14
2022/0410862 A1 * 12/2022 Hossfeld ............... F16D 55/226
2023/0080487 A1 * 3/2023 Sakashita ................ F16D 65/18 188/72.8
2023/0123351 A1 * 4/2023 Baek ..................... F16D 65/567 188/72.1
2023/0175564 A1 * 6/2023 Gerber ................ B60T 8/17613
2023/0271596 A1 * 8/2023 Jung ..................... F16D 65/183
2023/0286484 A1 * 9/2023 Shin ........................ F16D 65/18

FOREIGN PATENT DOCUMENTS

JP 2020040474 A 3/2020
KR 20170008094 A 1/2017
WO 2020066645 A1 4/2020

OTHER PUBLICATIONS

Japanese Patent Office, Office Action in Application No. JP2023-571296, dated Jun. 2, 2026, 6 pages.

* cited by examiner

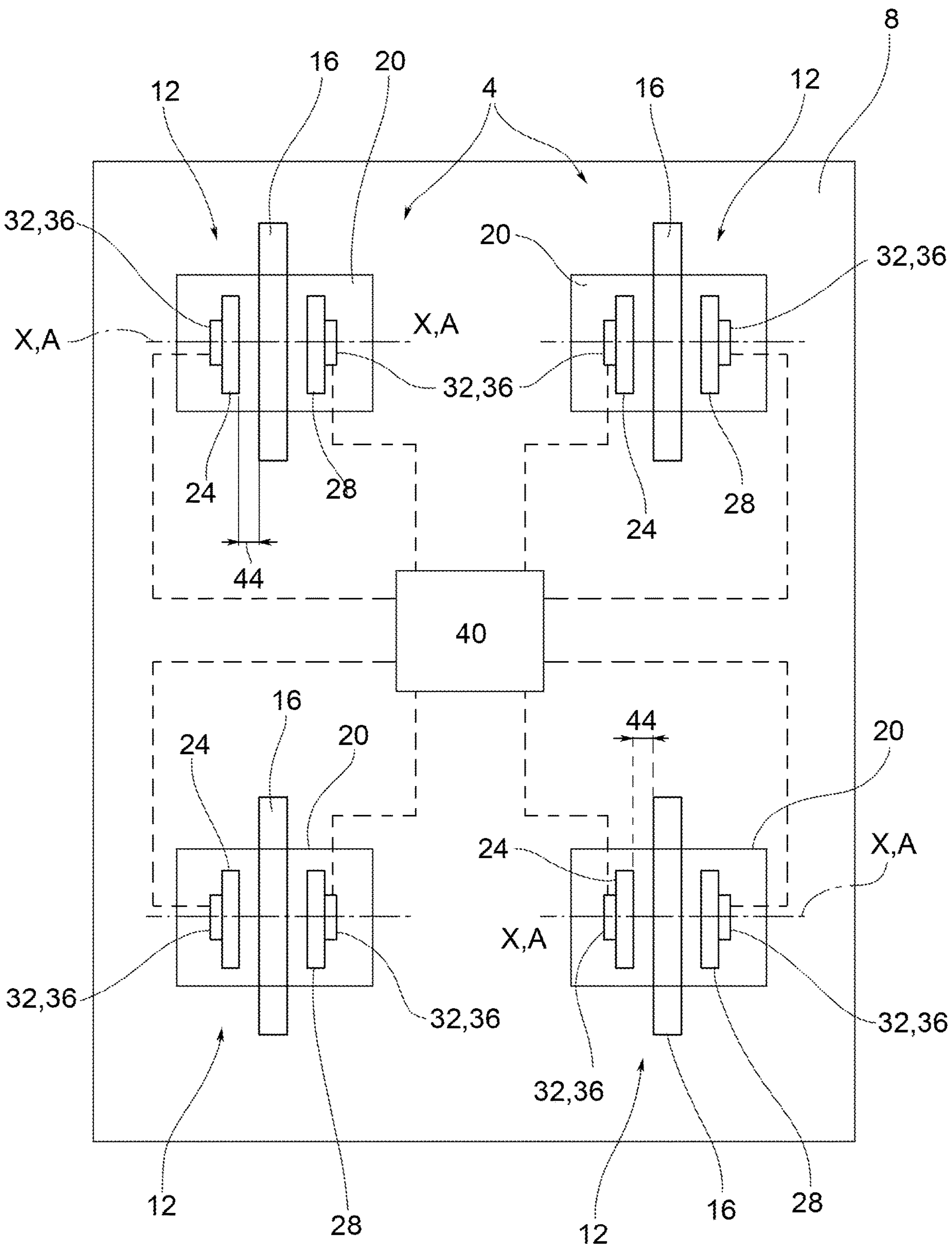
8
12
16
20
4
16
12
32,36
20
32,36
X,A
X,A
32,36
24
28
24
28
44
40
16
44
24
20
20
X,A
24
X,A
32,36
32,36
32,36
32,36
12
28
12
16
28

BRAKING SYSTEM WITH BRAKE-BY-WIRE TYPE DISC BRAKES, EQUIPPED WITH DYNAMIC ADJUSTMENT OF THE DISTANCE BETWEEN THE BRAKE DISC AND THE PADS AND RELATED METHOD FOR ADJUSTING THE DISTANCE BETWEEN THE BRAKE DISC AND PADS IN A BRAKE-BY-WIRE TYPE BRAKING SYSTEM

FIELD

The present invention relates to a brake-by-wire (BBW) disc braking system equipped with dynamic adjustment of the distance between the brake disc and pads. Further, the invention concerns a method for adjusting the distance between the brake disc and pads in a BBW-type braking system.

BACKGROUND

On hydraulic-type disc brake calipers, the distance between the brake disc and pads is defined at the design stage and may not be actively changed. The caliper piston is only passively withdrawn or retracted through the elastic deformation of the seals when the brake control, and thus the hydraulic pressure within the braking system, is released. The piston seals and their seats may be designed so that the seals undergo greater deformation and thus so that a greater force and return stroke (roll back) of the piston is achieved on release. However, this results in a worsening of the braking requirement of having a low brake fluid transfer/displacement and a better braking feel on the pedal (i.e., reduced actuation travel of said pedal). In any case in the known solutions, the position of the piston may not be changed at will while the vehicle is in use.

In BBW-type braking systems without hydraulic fluid, and thus equipped with electro-mechanical calipers, the distance between the brake disc and the pads may be controlled and changed at any time via software, but its value may not be chosen arbitrarily, since it results from a compromise between the following different needs:

- a large or high clearance reduces the residual braking torque on the brake disc and the associated pad wear, but significantly increases the brake response time since it introduces a non-negligible delay between the user's demand for braking action and the actual initiation thereof;
- a small or reduced distance increases braking readiness by reducing the delay in the generation of braking torque, but at the same time it increases the residual braking torque in the absence of a braking demand, pad wear, as well as increasing vehicle fuel consumption resulting in reduced vehicle range (especially in the case of electrically powered vehicles). It also increases the overall pollution of the vehicle in terms of energy consumed and the emission of dust and particles due to pad wear.

Therefore, the distance between the brake disc and pads is a compromise to achieve effective braking action on the one hand and the lowest possible residual torque on the other.

As the solutions of the prior art do not allow dynamic, i.e., real-time, changes in the distance between the brake disc and pads, they do not allow for the optimization of the braking action and the reduction of the residual torque under all the dynamic conditions of vehicle use.

SUMMARY

The need is therefore felt in the art to provide a braking system which allows the technical drawbacks mentioned with reference to the prior art to be resolved.

This need is satisfied by a braking system and a method for controlling the braking system as described and claimed herein.

In particular, this need is met by a braking system for a vehicle comprising:

- at least one disc brake comprising a brake disc having a disc brake caliper arranged to straddle the brake disc, and at least one pair of pads opposite each other and acting on said brake disc from opposite sides along an axial direction of actuation, parallel to an axis of rotation of the brake disc,
- at least one electric actuator, operatively connected to a piston acting as a pusher on at least one of said pads along said actuation direction,
- a processing and control unit, operatively connected to said electric actuator, and programmed so as to move the piston and the relative pad along the axial direction, in a forward position so as to press the pad into contact with the brake disc during a braking demand, and so as to bring the piston into a rest or rearward position in which a gap is identified between the pad and the brake disc, wherein the processing and control unit is programmed to implement an algorithm that, in the absence of a demand for braking action, operates the electric actuator by varying said gap according to at least one dynamic parameter of the vehicle that defines the prediction of a future demand for braking action, so as to increase the gap when a demand for braking action is not imminent, and to reduce the gap when a demand for braking action is not imminent.

According to an embodiment, said disc brake caliper at said pad comprises thrust means such as springs or spiders which exert an elastic action of axially distancing the pad from the brake disc so as to retract the pad toward the relevant piston, in the absence of a demand for braking action.

According to an embodiment, the pad is constrained to the relevant piston so that it translates integrally with it along the axial direction of actuation.

According to an embodiment, said algorithm decides whether to establish the gap at a maximum or high value, which corresponds to a defined low residual torque and high response time, or to establish the gap at a low value, which corresponds to a high residual torque and low response time.

According to an embodiment, said dynamic parameter of the vehicle comprises a collision time estimated as the time required for a collision to occur between the vehicle equipped with said braking system and a further vehicle preceding it, without varying the respective speeds and trajectories of said vehicles. If the estimated collision time is reduced, then the gap is also reduced and vice versa.

According to an embodiment, said collision time is estimated as a function of a coefficient of friction of the road surface driven over by the vehicle equipped with said braking system. If the coefficient of friction is reduced then the gap is also reduced and vice versa.

According to an embodiment, said collision time is estimated as a function of a difference in acceleration between the vehicle equipped with said braking system and a further vehicle preceding it. If the difference in acceleration leads to a possible need for braking or a possible collision, then the gap is reduced and vice versa.

According to an embodiment, said dynamic parameter of the vehicle comprises a hazard index, i.e., a dimensionless index defining the collision risk between two vehicles defined as the relationship between a critical braking distance and a critical hazard distance, such that if the critical braking distance is less than the critical hazard distance, the gap is reduced and vice versa.

According to an embodiment, said dynamic parameter of the vehicle comprises a predetermined safety distance between the vehicle equipped with said braking system and a further vehicle preceding it. Obviously if said safety distance is reduced then the gap is also reduced and vice versa.

According to an embodiment, said dynamic parameter of the vehicle equipped with said braking system comprises an emergency signal coming from a vehicle preceding it, with which the vehicle following it is in connection.

According to an embodiment, said dynamic parameter comprises information about real-time traffic conditions along the route of the vehicle.

According to an embodiment, said dynamic parameter of the vehicle equipped with said braking system comprises information about real-time conditions of the route of the vehicle, such as speed limits and/or incline of the road and/or bends.

According to an embodiment, said dynamic parameter of the vehicle comprises a comfort demand by the vehicle's passengers, so as to increase the gap in case of a need for more comfort, and vice versa.

According to an embodiment, said gap variation by the electric actuator is of a discrete type.

According to an embodiment, the algorithm identifies a minimum collision time value and a maximum collision time value. If the value of the collision time is kept within this range, the gap is kept in its current state, while the gap is changed if the collision time exceeds said thresholds defined by said minimum and maximum collision time values. Obviously, in particular, a low collision time implies a probable demand for braking in the short term, while a high collision time implies an unlikely demand for braking in the short term. If the collision time exceeds said maximum value, the gap is established in its upper value, which corresponds to a lower residual torque and a higher response time; conversely, if the collision time becomes less than said minimum value, the gap is established in its lower value, which corresponds to a higher residual torque and a lower response time.

According to an embodiment, the minimum value of collision time is 4.5 s and the maximum value of collision time is 5 s.

According to an embodiment, said variation of the gap by the electric actuator is of a continuous type, so as to vary said gap according to said dynamic parameter of the vehicle, between a minimum and a maximum value.

The invention also covers a vehicle comprising a braking system as previously described.

The present invention also relates to a method for controlling a braking system comprising the step of setting up a braking system 4 for a vehicle 8 comprising:

at least one disc brake comprising a brake disc having a disc brake caliper arranged to straddle the brake disc;

and at least one pair of pads opposite each other and acting on said brake disc on sides opposite each other along an axial direction of actuation, parallel to an axis of rotation of the brake disc; at least one electric actuator, operatively connected to a piston acting as a pusher on at least one of said pads along said direction of actuation;

a processing and control unit, operatively connected to said electric actuator and programmed to move the piston and the respective pad along the axial direction to a forward position so as to press the pad in contact with the brake disc during a braking demand and so as to bring the piston and respective pad to a rest or rearward position, wherein a gap is identified between the pad and the brake disc;

wherein the processing and control unit is programmed to implement an algorithm that, in the absence of a braking demand, operates the electric actuator by varying said gap as a function of at least one dynamic parameter of the vehicle that defines the prediction of a future demand for braking action, so as to increase the gap when a braking action is imminent, and decrease the gap when a braking action is not imminent.

DESCRIPTION OF THE FIGURES

Further features and advantages of the present invention will become more apparent from the following description of preferred and non-limiting embodiments thereof, wherein:

The only FIGURE shows a schematic view of a vehicle comprising a braking system according to an embodiment of the present invention.

Elements or parts of elements common to the embodiments described hereinafter will be indicated with the same reference numerals.

DETAILED DESCRIPTION

With reference to the aforesaid FIGURE, reference numeral 4 globally denotes a braking system for a vehicle 8.

The braking system 4 comprises at least one disc brake 12 comprising a brake disc 16 having a disc brake caliper 20 arranged to straddle the brake disc 16, and at least one pair of pads 24,28 opposite each other and acting on said brake disc 16 on sides opposite each other along an axial direction of actuation A-A, parallel to an axis of rotation X-X of the brake disc 16. It should be noted that the present invention applies to both fixed-type and floating-type disc brake calipers 20 known in the art.

The disc brake 12 further comprises at least one electric actuator 32 operatively connected to a piston 36 acting as a pusher on at least one of said pads 24 along said axial direction of actuation A-A. In the case of fixed-type disc brake calipers 20, there will be at least one piston 36 acting on at least one pad 24 on each side of the brake disc 16. In the case of floating-type disc brake calipers, there will be at least one piston 36 acting on at least one pad 24 on only one side of said brake disc 16.

The braking system 4 further comprises a processing and control unit 40, operatively connected to said electric actuator 32 and programmed to move the piston 36 and the respective pad 28 along the axial direction of actuation A-A to a forward position, so as to press the pad 28 into contact with the brake disc 16 during a braking demand and so as to bring the piston 36 and the respective pad 28 to a rest or rearward position, wherein a gap 44 between the pad 28 and the brake disc 16 is identified.

Said processing and control unit 40 may be stand-alone, physically integrated into the packaging of the actuator, or integrated into other control units already in the vehicle to perform various functions.

The connection between the electric actuator 32 and the piston may be direct or involve intermediate kinematics, in a known manner.

It is worth noting that said disc brake caliper 20, at said brake pad 24 may comprise thrust means such as springs or spiders 48 which exert an elastic action of axially distancing the pad 24 from the brake disc 16 so as to retract the pad 24 towards the respective piston 36, in the absence of a demand for braking action.

According to a further embodiment, it is possible to constrain the pad 24 to the respective piston 36 so that it translates integrally therewith.

Advantageously, the processing and control unit 40 is programmed to implement an algorithm that, in the absence of a braking demand from the user of the vehicle 8, operates the electric actuator 32 varying said gap 44 as a function of at least one dynamic parameter of the vehicle that defines the prediction of a future demand for braking action by the user, so as to increase the gap 44 when a demand for a braking action is not imminent and reduce the gap 44 when a demand for a braking action is not imminent.

Specifically, said algorithm maintains the gap 44 in a range between a maximum value, where there is negligible residual torque (or less than a very low value), i.e., no braking action exerted on the brake disc 16, and a minimum value, where a residual torque or braking action on the brake disc 16 is tolerated.

In this way, if the demand for a braking action is not deemed to be probable, the gap 44 is increased so as to ensure the absence of any braking torque; this is done at the expense of the disc brake's responsiveness to a braking demand that is, however, deemed, as seen, to be either not probable or unlikely.

On the other hand, if the demand for braking action is deemed to be probable, the gap 44 is reduced so as to possibly tolerate a small braking torque; this is done to the advantage of the responsiveness of the disc brake to a braking demand that, as seen, is deemed to be probable.

The algorithm implemented by the processing and control unit 40 may comprise different dynamic parameters of the vehicle.

It should be premised that the dynamic parameters in the following are not alternatives to each other, but may be combined; in other words, the processing and control unit 40 may consider one or more dynamic parameters of the vehicle in order to implement a more or less sophisticated algorithm that takes into account a plurality of parameters that contribute to the definition of the best and most efficient strategy for adjusting said gap 44 according to the actual and contingent driving conditions of the vehicle 8.

According to an embodiment of the present invention, the dynamic parameter comprises a collision time, estimated as the time required for a collision to occur between the vehicle 8 equipped with said braking system 4 and a further vehicle preceding it, without changing the respective speeds and trajectories of said vehicles. If the estimated collision time is reduced then the gap 44 is also reduced and vice versa.

According to a possible embodiment of the present invention, said collision time is estimated as a function of a coefficient of friction of the road surface driven on by the vehicle 8 equipped with said braking system 4. If the coefficient of friction is reduced, then the gap 44 is also reduced and vice versa.

According to a possible embodiment of the present invention, said collision time is estimated as a function of a difference in acceleration between the vehicle 8 equipped with said braking system 4 and an additional vehicle preceding it. If the acceleration difference increases, then the gap 44 also decreases and vice versa.

According to a possible embodiment of the present invention, said dynamic parameter of the vehicle 8 comprises a hazard index, i.e., a dimensionless index that defines the risk of collision between two vehicles defined as the relationship between a critical braking distance and a critical hazard distance, so that if the critical braking distance is less than the critical hazard distance, the gap 44 is reduced and vice versa.

According to a further embodiment of the present invention, said dynamic parameter of the vehicle comprises a predetermined safety distance between the vehicle 8 equipped with said braking system 4 and a further vehicle preceding it. Obviously if said safety distance is reduced, then the gap 44 is also reduced and vice versa.

According to a further embodiment, said dynamic parameter of the vehicle equipped with said braking system comprises an emergency signal coming from a vehicle preceding it, with which the vehicle following it is in connection. In other words, if the vehicle preceding it detects a hazardous situation, then it sends a hazard signal that is picked up by the processing and control unit 40 which commands the electric actuator in order to reduce said gap 44. In effect, the presence of a potential hazardous situation increases the probability of a braking demand and therefore justifies the reduction of the gap 44 and vice versa.

According to a further embodiment, said dynamic parameter comprises information on real-time traffic conditions along the route of the vehicle. Also in this case, the intensification of traffic or information on the approach of a slowdown or jam along the route taken by the vehicle 8 statistically increases the probability of braking demands and thus justifies the reduction of said gap 44 and vice versa.

According to a possible embodiment, said dynamic parameter of the vehicle 8 equipped with said braking system 4 comprises information about real-time conditions on the route of the vehicle, such as speed limits and/or incline of the road and/or bends.

In fact, the presence of a lowered speed limit, a downhill section of road, or a bend all constitute conditions that statistically increase the probability that the user will demand a braking action, and thus they result in the reduction of said gap 44 and vice versa.

According to a further embodiment of the present invention, said dynamic parameter of the vehicle comprises a demand for comfort for passengers of the vehicle 8 so as to increase the gap 44 in case of a need for more comfort and vice versa. In particular, a greater demand for comfort requires a less abrupt braking action and vice versa.

According to the present invention, the variation of the gap 44 by the electric actuator 32 may be of a discrete type.

For example, the algorithm identifies a minimum collision time value and a maximum collision time value, so the change in the gap 44 is made discretely when the collision time exceeds the thresholds defined by those minimum and maximum values, respectively.

According to an embodiment, the minimum collision time value is 4.5 s and the maximum collision time value is 5 s.

According to a further embodiment of the present invention, the variation of the gap 44 by the electric actuator 32 is of a continuous type, so as to vary said gap 44 according to said dynamic parameter of the vehicle 8, between a minimum value and a maximum value.

As may be appreciated from what has been described, the present invention overcomes the drawbacks of the prior art.

Specifically, the braking system of the present invention allows the distance between the brake disc and its pads to be adjusted dynamically and in real time, as a function of a plurality of dynamic parameters of the vehicle and actual, contingent driving conditions.

In this way, the responsiveness to the braking action varies according to a plurality of dynamic parameters of the vehicle that take into account the greater or lesser likelihood that the user will require a braking action depending on traffic, road, hazard, comfort conditions, etc. Thus, when the braking action is not likely, the gap is increased so as to avert any residual torque at the expense of braking readiness, whereas if the braking action is deemed probable, the gap is reduced so as to reduce braking readiness, at the expense of any residual torque, albeit small. It is clear that, overall, the residual torque is normally reduced, thus also reducing the consumption of the friction material of the pads as well as the consumption of the vehicle (whether fuel and/or electricity).

In this way, in addition to improving driving safety, it is also possible to reduce pad wear, reduce residual braking torque, increase overall vehicle range, reduce particle pollutant emissions from pad wear, and reduce pollutant emissions from the internal combustion engine of vehicles.

Further, as seen, it is possible to improve the driving feel felt by the driver when demanding a braking action since the system allows the gap between the brake disc and the pads, and thus the delay between the demand for braking action and the initiation thereof, to be reduced as much as possible.

It is also possible, as shown, to improve the comfort of the driver and thus the passengers of the vehicle and, in general, the active dynamic safety conditions of said vehicle.

A person skilled in the art, in order to satisfy contingent and specific needs, may make numerous modifications and variations to the systems and methods described above, said modifications and variations all being contained within the scope of the invention as defined in the following claims.

The invention claimed is:

1. A braking system for a vehicle, comprising:

at least one disc brake comprising a brake disc having a disc brake caliper arranged to straddle the brake disc, and at least one pair of pads opposite each other and acting on said brake disc from opposite sides along an axial direction of actuation, parallel to an axis of rotation of the brake disc, at least one electric actuator, operatively connected to a piston acting as a pusher on at least one of said pads along said axial direction of actuation, and a processing and control unit, operatively connected to said electric actuator, and programmed to move said piston and respective pad, along the axial direction of actuation, in a forward position so as to press the pad in contact with the brake disc during a braking demand, and bring the piston and the respective pad into a rest or rearward position, in which a gap is identified between the pad and the brake disc, wherein the processing and control unit is programmed to implement an algorithm that, in absence of the braking demand, operates the electric actuator varying said gap as a function of at least one dynamic parameter of the vehicle that defines a prediction of a demand for braking action, so as to increase the gap when the demand for braking action is not imminent, and to reduce the gap when the demand for braking action is imminent.

2. The braking system of claim 1, wherein said disc brake caliper, at said pad comprises thrust means, optionally said thrust means being springs or spiders, that exert an elastic action of axially distancing the pad from the brake disc so as to retract the pad towards the respective piston, in absence of the demand for braking action.

3. The braking system of claim 1, wherein the pad is connected to the respective piston so as to translate integrally therewith along the axial direction of actuation.

4. The braking system of claim 1, wherein said algorithm decides whether to establish the gap at a maximum or high value corresponding to a low residual torque and a high response time, or to establish the gap at a low value corresponding to a high residual torque and a low response time.

5. The braking system of claim 1, wherein said at least one dynamic parameter of the vehicle comprises a collision time estimated as the time required for a collision to occur between the vehicle equipped with the braking system and a further vehicle preceding it, without varying respective speeds and trajectories of said vehicles, so that if the estimated collision time is reduced then the gap is also reduced and vice versa.

6. The braking system of claim 5, wherein said collision time is estimated as a function of a coefficient of friction of a road surface driven over by the vehicle equipped with the braking system, so that if the coefficient of friction is reduced then the gap is also reduced and vice versa.

7. The braking system of claim 6, wherein said collision time is estimated as a function of a difference in acceleration between the vehicle equipped with the braking system and the further vehicle preceding it, so that if the difference in acceleration leads to a possible need for braking or a possible collision then the gap is reduced and vice versa.

8. The braking system of claim 1, wherein said at least one dynamic parameter of the vehicle comprises a hazard index, namely a dimensionless index defining a collision risk between two vehicles as a relationship between a critical braking distance and a critical hazard distance, such that if the critical braking distance is less than the critical hazard distance, the gap is reduced and vice versa.

9. The braking system of claim 1, wherein said at least one dynamic parameter of the vehicle comprises a predetermined safety distance between the vehicle equipped with the braking system and a further vehicle preceding it, such that if said safety distance is reduced then said gap is also reduced and vice versa.

10. The braking system of claim 1, wherein said at least one dynamic parameter of the vehicle equipped with the braking system comprises an emergency signal coming from a further vehicle preceding it, with which the vehicle equipped with the braking system is in connection.

11. The braking system of claim 1, wherein said at least one dynamic parameter of the vehicle comprises information about real-time traffic conditions along a route of the vehicle.

12. The braking system of claim 1, wherein said at least one dynamic parameter of the vehicle comprises information about real-time conditions of a route of the vehicle, including at least one of speed limits, incline of road, and bends.

13. The braking system of claim 1, wherein said at least one dynamic parameter of the vehicle comprises a comfort demand by passengers, so as to increase the gap in case of need for more comfort, and vice versa.

14. The braking system of claim 1, wherein a variation of the gap by the electric actuator is of discrete type.

15. The braking system of claim 14, wherein said algorithm decides whether to establish the gap at a maximum or high value corresponding to a low residual torque and a high response time, or to establish the gap at a low value corresponding to a high residual torque and a low response time, wherein the algorithm identifies a minimum value of collision time and a maximum value of collision time, and wherein the variation of the gap is performed discretely when the collision time exceeds thresholds defined by said minimum and maximum values of collision time, respectively.

16. The braking system of claim 15, wherein the minimum value of collision time is 4.5 s and the maximum value of collision time is 5 s.

17. The braking system of claim 1, wherein a variation of the gap by the electric actuator is of continuous type, so as to vary said gap as a function of said at least one dynamic parameter of the vehicle, between a minimum value and a maximum value.

18. A vehicle comprising the braking system of claim 1.

* * * * *